United States Patent
Tse et al.

(10) Patent No.: US 9,348,533 B2
(45) Date of Patent: May 24, 2016

(54) MEMORY IMAGE CAPTURE VIA MEMORY WRITE FROM A RUNNING SYSTEM

(71) Applicant: Microsoft Technology Licensing, LLC, Redmond, WA (US)

(72) Inventors: Tai Hing Tse, Bellevue, WA (US); Landy Wang, Honolulu, HI (US); Yimin Deng, Redmond, WA (US); Kenneth D. Johnson, Bellevue, WA (US); Yevgeniy M. Bak, Redmond, WA (US); Chiuchin Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 13/830,405

(22) Filed: Mar. 14, 2013

(65) Prior Publication Data
US 2014/0281305 A1 Sep. 18, 2014

(51) Int. Cl.
*G06F 12/00* (2006.01)
*G06F 3/06* (2006.01)
*G06F 11/07* (2006.01)

(52) U.S. Cl.
CPC .............. *G06F 3/065* (2013.01); *G06F 3/0604* (2013.01); *G06F 3/0671* (2013.01); *G06F 11/0778* (2013.01)

(58) Field of Classification Search
USPC ......................................................... 711/161
See application file for complete search history.

(56) References Cited

U.S. PATENT DOCUMENTS

| | | | |
|---|---|---|---|
| 5,293,612 A | 3/1994 | Shingai | |
| 6,339,818 B1 * | 1/2002 | Olszewski et al. | 711/173 |
| 7,028,056 B1 | 4/2006 | Hendel et al. | |
| 7,506,203 B2 | 3/2009 | Nellitheertha | |

(Continued)

FOREIGN PATENT DOCUMENTS

WO 2005/089400 A2 9/2005

OTHER PUBLICATIONS

"International Search Report & Written Opinion for PCT Patent Application No. PCT/US2014/021458", Mailed Date: Jun. 3, 2014, Filed Date: Mar. 7, 2014, 11 Pages.

(Continued)

*Primary Examiner* — Baboucarr Faal
(74) *Attorney, Agent, or Firm* — Sunah Lee; Judy Yee; Micky Minhas

(57) ABSTRACT

Techniques for memory image capture via memory write from a running system are described. In at least some embodiments, a request is received for an image of a portion of memory. Images of memory can be used for a variety of purposes, such as diagnosing and repairing error conditions for hardware and/or software, detecting unwanted and/or malicious processes (e.g., malware), general systems maintenance, and so forth. According to one or more embodiments, various techniques can be implemented to capture an image of a portion of memory. For example, an intermediate write to memory can be employed to write the image of the portion of memory to a memory buffer. Alternatively or additionally, an image of a portion of memory can be captured directly to storage.

20 Claims, 6 Drawing Sheets

(56) References Cited

U.S. PATENT DOCUMENTS

| | | |
|---|---|---|
| 2004/0143717 A1 | 7/2004 | Cantrill |
| 2004/0205399 A1 | 10/2004 | Wang et al. |
| 2005/0204107 A1 | 9/2005 | Narayan et al. |
| 2006/0156057 A1 | 7/2006 | Babu |
| 2007/0168699 A1 | 7/2007 | Nellitheertha |
| 2008/0010409 A1* | 1/2008 | Rao et al. ............ 711/118 |
| 2009/0024820 A1 | 1/2009 | Ponnuswamy |
| 2009/0089336 A1 | 4/2009 | Dewey et al. |
| 2009/0105982 A1 | 4/2009 | Sarig et al. |
| 2011/0083064 A1* | 4/2011 | Kagan et al. ............ 714/807 |
| 2014/0137271 A1* | 5/2014 | Hyde et al. ............ 726/30 |

OTHER PUBLICATIONS

Depoutovitch, et al., "Otherworld—Giving Applications a Chance to Survive OS Kernel Crashes", *In Proceedings of the 5th European conference on Computer systems*, (Apr. 13, 2010), 14 pages.

"Second Written Opinion", Application No. PCT/US2014/021458, Mar. 24, 2015, 6 pages.

"International Preliminary Report on Patentability", Application No. PCT/US2014/021458, Jun. 29, 2015, 10 pages.

* cited by examiner

MEMORY IMAGE CAPTURE VIA MEMORY WRITE FROM A RUNNING SYSTEM

BACKGROUND

Computing devices occasionally experience error conditions, such as caused by hardware and/or software malfunctions. To correct an error condition and to prevent the error condition from occurring again in the future, it can be useful to obtain information about the error condition.

For example, consider a scenario where an application crashes while running on a computing device. To prevent the application from crashing again after it is reinitiated, it can be helpful to understand a state of the application and/or associated resources when the application crashed. One way of determining a state of the application when it crashed is by inspecting contents of memory that were being utilized by the application at the time of the crash. Some ways of obtaining such memory contents, however, can be disruptive of other processes running on an associated device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for memory image capture via memory write from a running system are described. In at least some embodiments, a request is received for an image of a portion of memory. Images of memory can be used for a variety of purposes, such as diagnosing and repairing error conditions for hardware and/or software, detecting unwanted and/or malicious processes (e.g., malware), general systems maintenance, and so forth.

According to one or more embodiments, various techniques can be implemented to capture an image of a portion of memory. For example, an intermediate write to memory can be employed to write the image of the portion of memory to a memory buffer. The image can subsequently be written to storage such that the image can be accessed by various entities and/or resources.

According to one or more embodiments, an image of a portion of memory can be captured directly to storage. Generally, storage refers to resources for persistent data storage, examples of which are detailed below. When utilizing direct to storage capture, system resources (e.g., processing resource, input/output (I/O) resources, and so on) can be paused while an image of a portion of memory is written to storage. Thus, techniques discussed herein provide a variety of ways and variations for capturing images of memory.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for memory image capture via memory write from a running system are described. In at least some embodiments, a request is received for an image of a portion of memory. The request, for example, can be received based on a variety of events. Examples of such events include a request from an application, a user-initiated request, a request from a service running on an associated device, and so on. The image, for instance, can correspond to a copy of the portion of memory, such as data stored at particular addresses in primary memory. Images of memory can be used for a variety of purposes, such as diagnosing and repairing error conditions for hardware and/or software, detecting unwanted and/or malicious processes (e.g., malware), general systems maintenance, and so forth.

According to one or more embodiments, various techniques can be implemented to capture an image of a portion of memory. For example, an intermediate write to memory can be employed to write the image of the portion of memory to a memory buffer. The image can subsequently be written to storage such that the image can be accessed by various entities and/or resources. As detailed below, utilizing an intermediate write to memory provides for minimal interruption of system resources, such as processing resources, memory resources, and so on.

According to one or more embodiments, an image of a portion of memory can be captured directly to storage. Generally, storage refers to resources for persistent data storage, examples of which are detailed below. When utilizing direct to storage capture, system resources (e.g., processing resource, input/output (I/O) resources, and so on) can be paused while an image of a portion of memory is written to storage. Thus, techniques discussed herein provide a variety of ways and variations for capturing images of memory.

In the following discussion, an example environment is first described that is operable to employ techniques described herein. Next, a section entitled "Example Procedures" describes some example methods in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
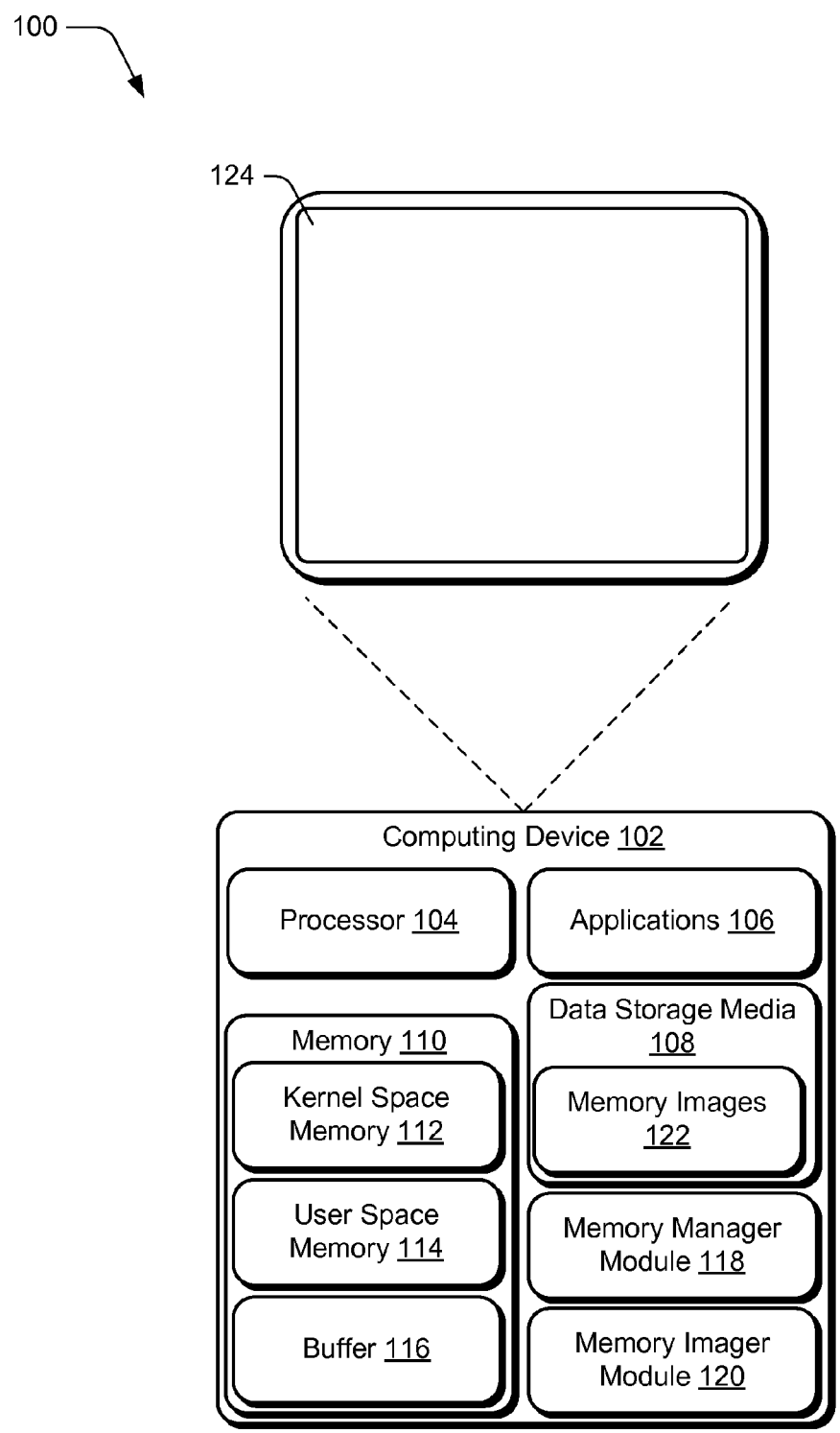
FIG. 1 is an illustration of an environment in an example implementation that is operable to employ techniques discussed herein.

FIG. 1 is an illustration of an environment 100 in an example implementation that is operable to employ techniques for memory image capture via memory write from a running system described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 6.

Computing device 102 includes a processor 104, which is representative of functionality to perform various types of data processing for the computing device 102. For example, the processor 104 can represent a central processing unit (CPU) of the computing device 102. Further examples of implementations of the processor 104 are discussed below with reference to FIG. 6.

The computing device 102 further includes applications 106, which are representative of functionalities to perform various tasks via the computing device 102. Examples of the applications 106 include a word processor application, an email application, a content editing application, a web browsing application, and so on. These examples are provided for purpose of illustration only, and the applications 106 can generally represent any service that can performs tasks and/or operations via the computing device 102.

Data storage media 108 are included, which are representative of media for persistent (e.g., non-volatile) data storage. Example implementations of the data storage media 108 are discussed below with reference to the computer-readable media 606 of FIG. 6.

The computing device 102 further includes a memory 110, which is representative of a volatile data storage medium that can be written to and read from by various functionalities of the computing device 102. The memory 110, for example, can represent a primary memory of the computing device 102 that can employed as data storage for processes running on the computing device 102. Further details and examples of the memory 110 are discussed below with reference to FIG. 6.

Included as part of the memory 110 are kernel space memory 112, user space memory 114, and a buffer 116. Generally, these portions of the memory 110 represent allocations of the memory 110 for storing data for associated processes. The size and/or allocation of the kernel space memory 112 and the user space memory 114, for example, varies depending on an amount of the memory 110 being utilized by processes associated with the respective memory spaces.

The buffer 116 represents a region of the memory 110 that can be employed to store memory images according to techniques discussed herein. Further details concerning utilization of the buffer 116 are discussed below.

A memory manager module 118 is also included, which is representative of functionality to manage various aspects of the memory 110. For example, the memory manager module 118 can allocate portions of the memory 110 to processes running on the computing device 102, e.g., the applications 106. The memory manager module 118 can allocate memory addresses of the memory 110 to particular processes, track memory addresses for particular processes, and provide other information concerning usage of the memory 110. Further details concerning the memory manager module 118 are provided below.

The computing device 102 further includes a memory imager module 120, which is representative of functionality to implement various aspects of the techniques for memory image capture via memory write from a running system discussed herein.

For example, consider a scenario where an error condition for one of the applications 106 is detected. The error condition, for instance, may be detected based on a crash of the application, a malfunction of the application (e.g., some functionality of the application not running properly), a slowing of application performance, an error message generated by the application, and so on.

Based on the error condition, the memory imager module 120 can initiate a process according to techniques discussed herein to capture a memory image of pages of the memory 110 associated with the application 106, e.g., at the time that the error condition occurred. For example, while the application 106 is running, it may be writing data to and/or reading data from the memory 110, such as using a portion of the user space memory 114. Other processes may also be accessing the memory 110, such as operating system processes that utilize the kernel space memory 112. Thus, the memory imager module 120 can implement techniques discussed herein to capture memory images of the kernel space memory 112, the user space memory 114, and/or other portions of the memory 110.

As detailed elsewhere herein, memory image can be captured with minimal disruption to other processes running on the computing device 102. For example, memory images can be captured by temporarily pausing other processes running on the computing device 102, capturing the memory images, and then resuming the other processes such that normal functionality of the computing device 102 can continue without crashing the computing device 102. The captured memory pages can be stored as memory images 122 in the data storage media 108, and accessed to determine a cause of the error condition for the application 106. The memory images 122, for example, can be bitmaps of the captured memory pages stored in the data storage media 108. Further details and variations of the techniques are discussed below.

The computing device 102 further includes a display device 124, which is configured to output graphics for the computing device 102. For instance, various functionalities of the memory imager module 120 can be configured via user input to a graphical user interface displayed via the display device 124.

Having described an example environment in which the techniques described herein may operate, consider now some example procedures in accordance with one or more embodiments.

Example Procedures

The following discussion describes some example procedures for memory image capture via memory write from a running system in accordance with one or more embodiments. The example procedures may be employed in the environment 100 of FIG. 1, the system 600 of FIG. 6, and/or any other suitable environment.

Figure 2:
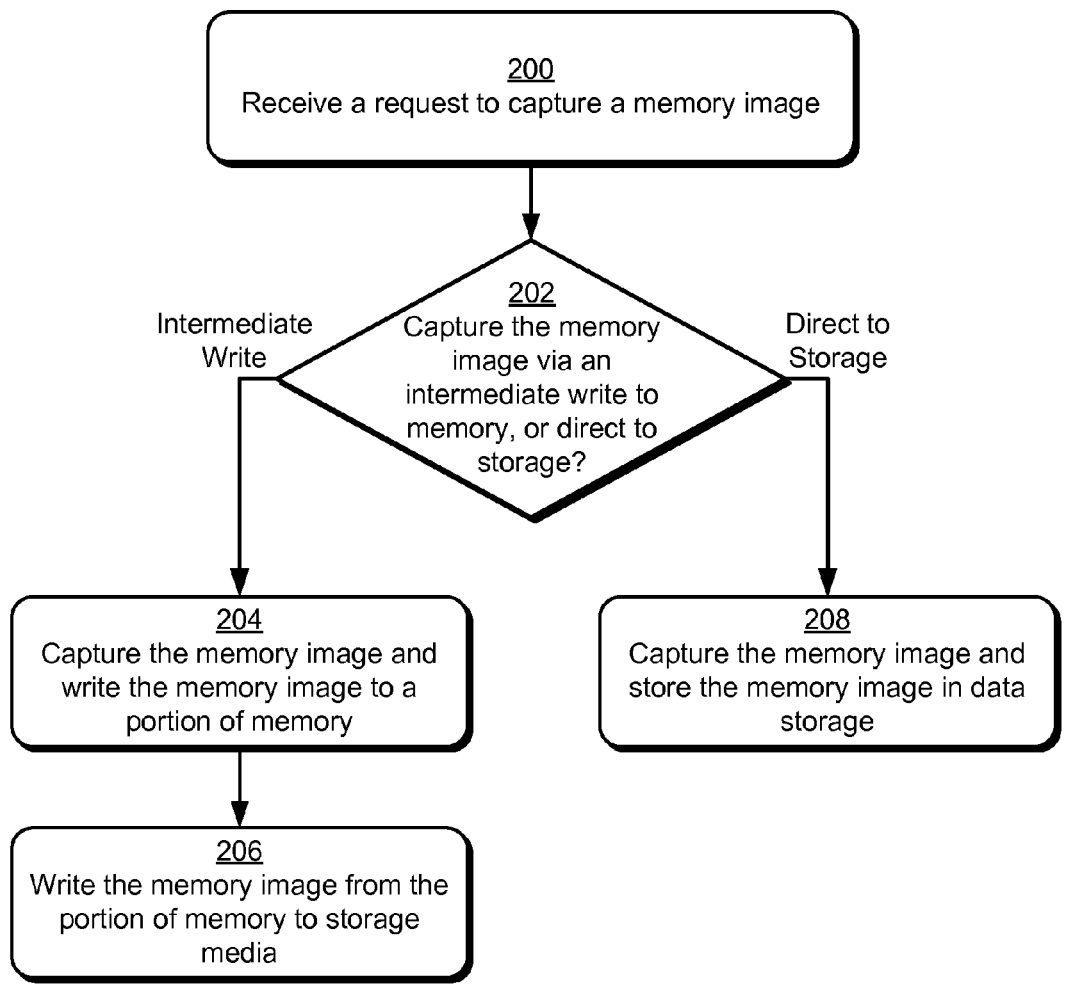
FIG. 2 is a flow diagram that describes steps in a method in accordance with one or more embodiments.

FIG. 2 is a flow diagram that describes steps in a method in accordance with one or more embodiments. Step 200 receives a request to capture an image of a portion of memory. As referenced above, a memory image can correspond to a snapshot of memory captured at a particular time, such as a bitmap of a portion of memory. For instance, a memory image of the memory 110 can correspond to a bitmap of memory pages of the kernel space memory 112, the user space memory 114, and/or other portions of the memory 110.

A request to capture a memory image can be received in response to a variety of events. For example, an application and/or service can request the memory image, such as in response to a crash and/or malfunction of the application and/or service. A driver for a hardware device, for instance, can detect that the device is not functioning properly. In response, the driver can request a memory image for the time at which the improper functioning occurs.

As another example, the request can be user-initiated, such as by an administrator and/or other personnel. A user, for example, can notice that a particular device, software, service, and so on, is not functioning properly. Thus, the user can provide input request a memory image, such as via input to a graphical user interface for the memory imager module 120.

As yet another example, a request for a memory image can be implemented by diagnostics and/or security services, such as further to locating unwanted and/or malicious processes. Thus, a captured memory image can be submitted to a security service such that it can be inspected for extraneous, unwanted, and/or malicious code. If such code is detected, the code can be removed.

Step 202 ascertains whether to capture the image of the portion of memory via an intermediate write to memory, or directly to storage. An intermediate write to memory, for example, can involve writing the memory image to the buffer 116 before it is subsequently stored on the data storage media 108. Alternatively, a direct to storage capture can involve writing the memory image directly to the data storage media 108 without writing to the buffer 116. Various ways of ascertaining whether to utilize an intermediate write to memory or a direct to storage write are discussed below.

If the memory image is to be captured via an intermediate write to memory ("Intermediate Write"), step 204 captures the memory image and writes the memory image to a portion of memory. The memory image, for example, can be written to the buffer 116. Step 206 writes the memory image from the portion of memory to storage media. For instance, the memory image can be written from the buffer 116 to the memory images 122 of the data storage media 108.

If the memory image is to be captured directly to storage ("Direct to Storage"), step 208 captures the memory image and stores the memory image in data storage. The memory image, for example, can be captured from the memory 110 and stored in the memory images 122 without an intermediate write of the memory image to the buffer 116 and/or other portion of the memory 110. Further details concerning implementation of this method are described below.

In at least some embodiments, an application and/or process can utilize techniques discussed herein as part of a "self-healing" process to recover from an error and/or malfunction condition. For instance, an application can initiate the method described above and can utilize the contents of the captured memory image to identify and repair a bug detected via the image.

Figure 3:
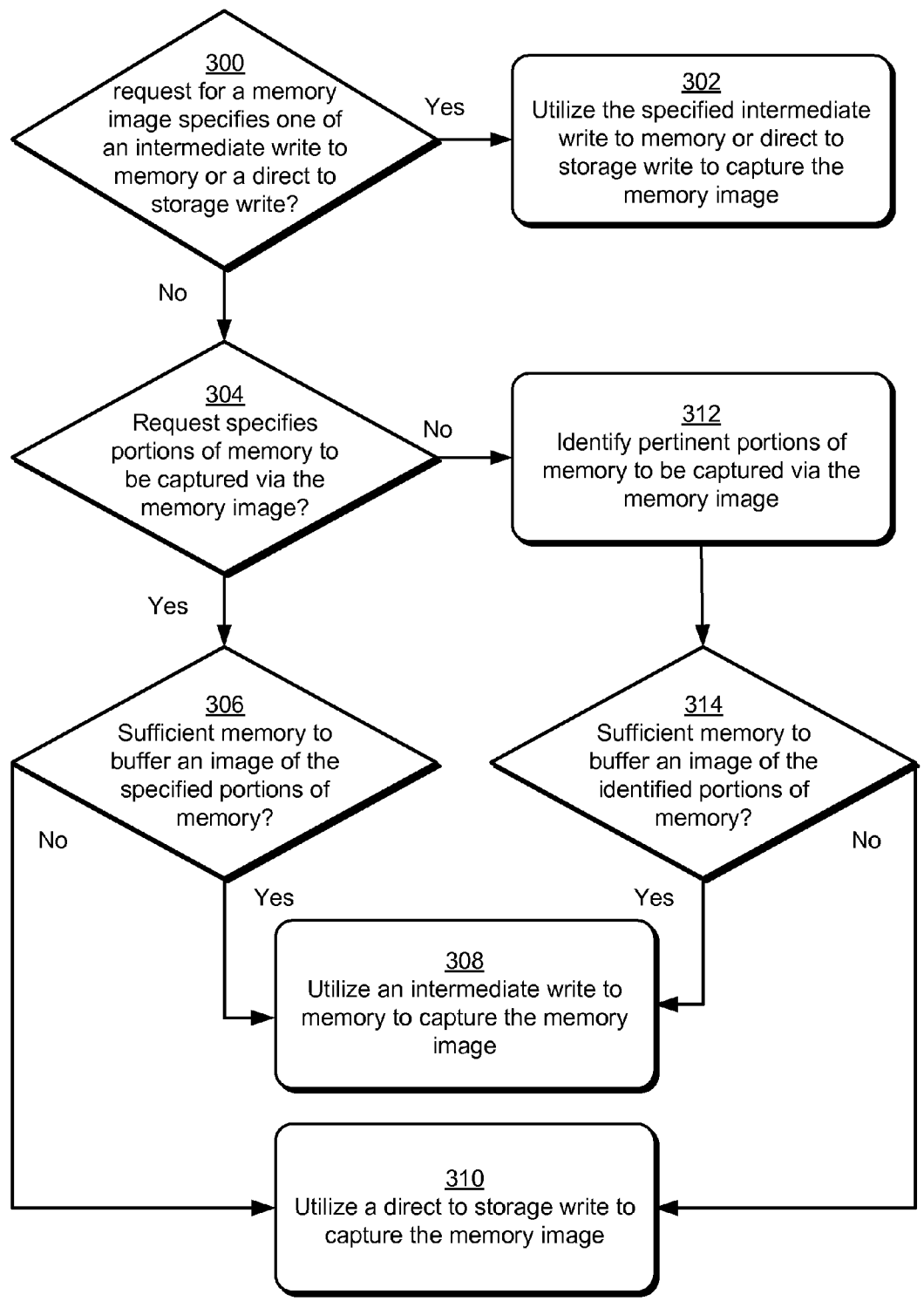
FIG. 3 is a flow diagram that describes steps in a method in accordance with one or more embodiments.

FIG. 3 is a flow diagram that describes steps in a method in accordance with one or more embodiments. In at least some embodiments, the method describes an example technique for determining whether to capture a memory image via in intermediate write to memory, or direct to storage. For example, the method describes an implementation of step 202 discussed above with reference to FIG. 2.

Step 300 determines whether a request for a memory image specifies one of an intermediate write to memory or a direct to storage write. For example, an application and/or service that is requesting the memory image can be preconfigured to utilize either an intermediate write to memory or a direct to storage write of an memory image.

If the request specifies one of an intermediate write to memory or a direct to storage write ("Yes"), step 302 utilizes the specified intermediate write to memory or a direct to storage write. For example, the request can include an application programming interface (API) function call (e.g., to the memory imager module 120) that specifies one of the intermediate write to memory or a direct to storage write.

If the request does not specify one of an intermediate write to memory or a direct to storage write ("No"), step 304 ascertains whether the request specifies portions of memory to be captured via the memory image. For example, the request can specify an image of portions of memory associated with particular processes, services, applications, devices, threads, and so on.

If the request specifies portions of memory to be captured via the memory image ("Yes"), step 306 determines whether there is sufficient memory space to buffer an image of the specified portions of memory. For example, the memory manager module 118 can identify portions of the memory 110 to be imaged. The portions of the memory 110 can be identified, for example, based on memory addresses associated with particular processes, services, applications, devices, threads, and so on, specified in the request. The memory manager module 118 can estimate the size of the portions of memory, e.g., in kilobits, megabits, gigabits, and so on. The memory manager module 118 can determine whether there is sufficient free space on the memory 110 (e.g., space not currently being used by a process) to store an image of the portions of memory.

If there is sufficient memory space to buffer the image of the specified portions of memory ("Yes"), step 308 utilizes an intermediate write to memory to capture the memory image. If there is not sufficient memory space to buffer the image of the specified portions of memory ("No"), step 310 utilizes a direct to storage write to capture the memory image.

In at least some embodiments, if there is not sufficient memory space to buffer an image of specified portions of memory, the specified portions of memory to be imaged can be filtered to reduce the memory size to fit within the available free memory space. For example, the portions of memory can be prioritized based on various factors, such as which portions were most recently accessed, which portions are associated with processes designated as being more important than others, and so on. Thus, portions of memory can be eliminated from those designated to be imaged, such as starting from lowest priority processes, until the size of memory to be imaged will fit within available free space in memory.

Thus, in at least some embodiments where there is not sufficient memory space to buffer an image of specified portions of memory, portions of memory can be eliminated from those designated to be imaged instead of switching to a direct to storage write for the memory image.

Returning to step 304, if the request does not specify portions of memory to be captured via the memory image ("No"), step 312 identifies pertinent portions of memory to be captured via the memory image. The memory imager module 120, for instance, can specify that portions of memory that have been accessed within a certain time frame are considered to be pertinent. For example, portions of memory that have been written to and/or read from within a certain time threshold (e.g., a previous 500 milliseconds, 1 second, and so on) can be considered to be pertinent portions of memory. The memory manager module 118 can track memory access information, and thus can enable such portions of memory to be identified.

Step 314 determines whether there is sufficient memory space to buffer an image of the identified portions of memory. As referenced above, the memory manager module 118 can determine a memory size for a memory image, and whether there is sufficient free space in memory to store the memory image.

If there is sufficient memory space to buffer the identified portions of memory ("Yes"), step 308 utilizes an intermediate write to memory to capture the memory image. If there is not sufficient memory space to buffer the identified portions of memory ("No"), step 310 utilizes a direct to storage write to capture the memory image.

Figure 4:
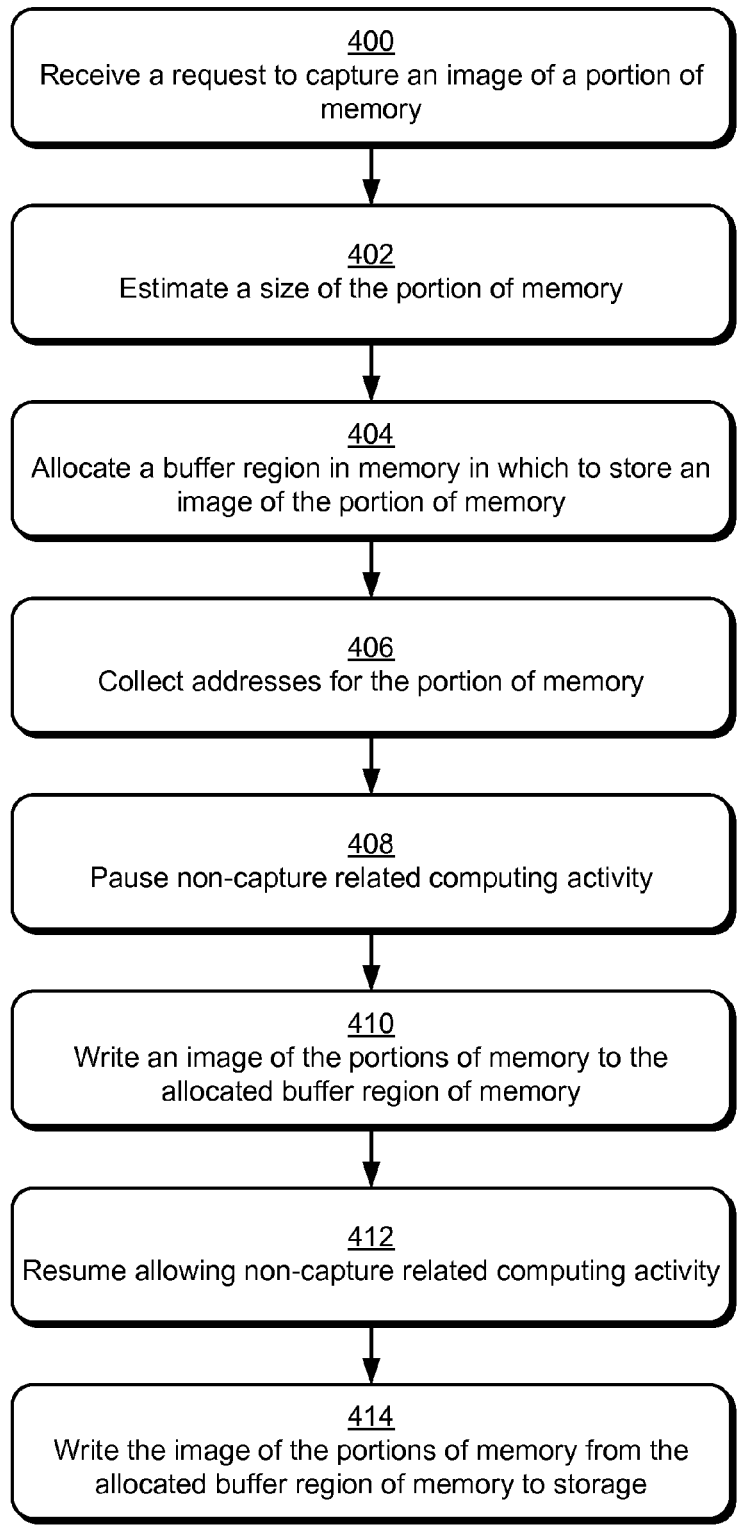
FIG. 4 is a flow diagram that describes steps in a method in accordance with one or more embodiments.

FIG. 4 is a flow diagram that describes steps in a method in accordance with one or more embodiments. In at least some embodiments, the method describes an example technique for capturing an image of portions of memory using an intermediate write to memory.

Step 400 receives a request to capture an image of a portion of memory. Various ways in which the request can be received are discussed above. In at least some embodiments, the request can specify portions of kernel space memory, user space memory, and/or other portions of memory. The request may additionally or alternatively be based on which portions of memory are most active, e.g., which portions have most recently been accessed within a particular time period.

Step 402 estimates a size of the portion of memory. The size, for example, can be estimated based on a number of memory pages included in the portion of memory. Additionally or alternatively, the size can be estimated based on memory addresses identified for the portion of memory, e.g., by the memory manager module 118.

Step 404 allocates a buffer region in memory in which to store the image of the portion of memory. The buffer region, for example, can be allocated such that sufficient space is available to store the image (e.g., a bitmap) of the portion of memory.

Step 406 collects addresses for the portion of memory. Memory addresses for the identified portion(s) of memory can be gathered, e.g., by a memory controller for the memory 110.

Step 408 pauses non-capture related computing activity (e.g., interrupts). For example, interrupts to a processor can be paused. The memory imager module 120, for example, can interact with an operating system kernel associated with the processor to temporarily suspend interrupts to a processor. Further, accesses to memory (e.g., the memory 110) not related to the capture process can be prevented during the capture process.

While not expressly illustrated here, in at least some embodiments additional memory addresses can be collected for the memory imaging operation after non-capture related computing activity is paused.

Step 410 writes an image of the portion of memory to the allocated buffer region of memory. A memory controller for the memory 110, for example, can use the collected memory addresses to read the identified portions of the memory 110, e.g., from the kernel memory space 112, the user memory space 114, and/or other portion of the memory 110. The memory controller can write the portions of memory to the buffer 116.

Step 412 resumes allowing non-capture related computing activity. For example, interrupts can be permitted to access a processor, access to the memory can be enabled, and so forth.

Step 414 writes the image of the portions of memory from the allocated buffer region of memory to storage. The memory imager module 120, for instance, can receive the image from a memory controller for the memory 110, and can submit the image for storage as part of the memory images 122.

In at least some embodiments, the image of the portions of memory can be accessed (e.g., by a debug utility, various personnel, and so on) to identify and resolve issues with software, hardware, and so on. Thus, the method discussed above describes an example technique for capturing an image of a portion of memory without requiring a system (e.g. processor interrupts) to be paused while the image is written to storage, e.g., to non-volatile memory. Further, the technique enables a memory image to be requested and gathered without crashing an associated system, e.g., without stopping and rebooting the computing device 102.

Figure 5:
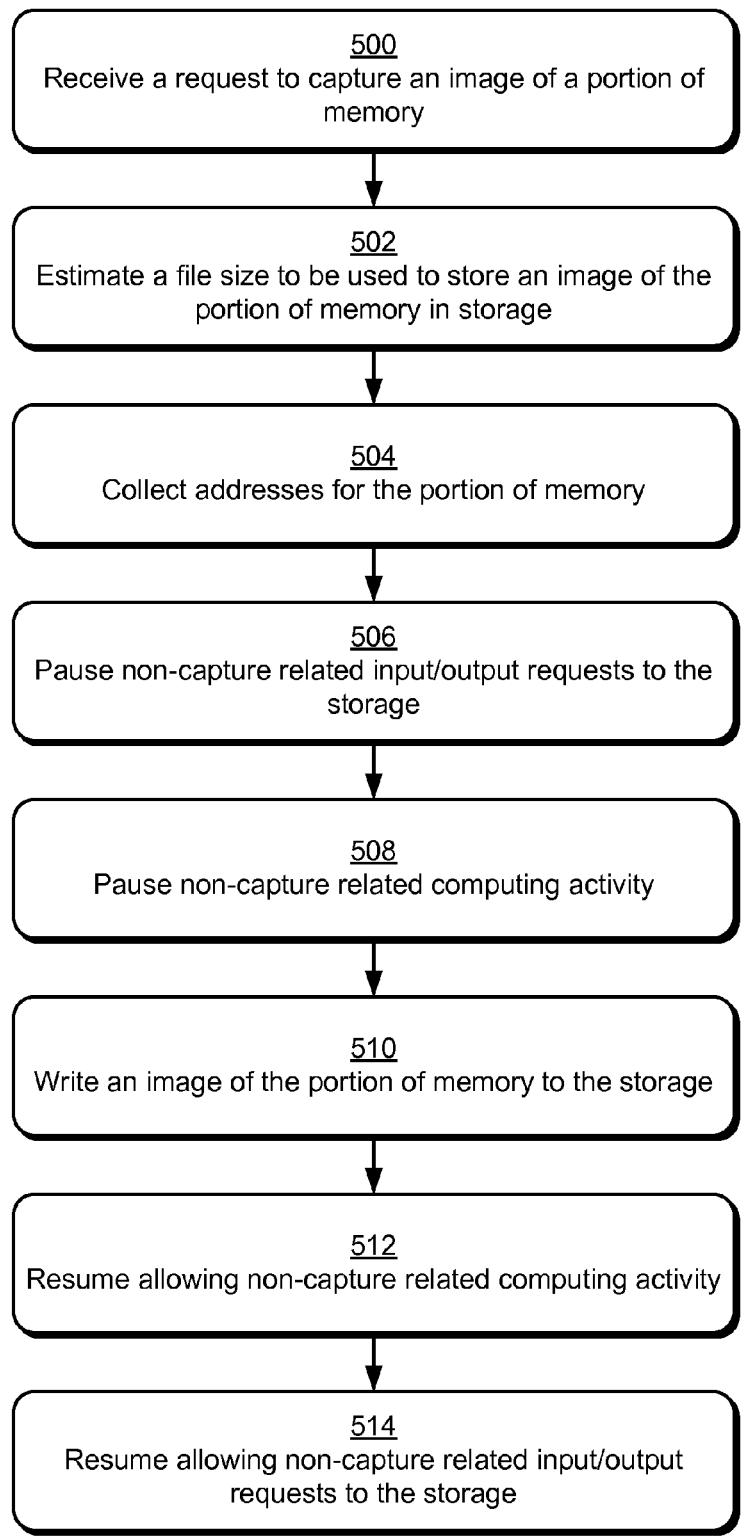
FIG. 5 is a flow diagram that describes steps in a method in accordance with one or more embodiments.

FIG. 5 is a flow diagram that describes steps in a method in accordance with one or more embodiments. In at least some embodiments, the method describes an example technique for writing an image of portions of memory to storage, e.g., without and/or independent of an intermediate write of the image to memory.

Step 500 receives a request to capture an image of a portion of memory. Various ways in which the request can be received are discussed above.

Step 502 estimates a file size to be used to store an image of the portion of memory in storage. The file size, for example, can be estimated based on a number of memory pages included in the portion of memory. Additionally or alternatively, the file size can be estimated based on memory addresses identified for the portion of memory, e.g., by the memory manager module 118. In at least some embodiments, a request can be sent to a controller for a storage device (e.g., for the data storage media 108) requesting that a portion of storage be allocated based on the estimated file size.

Step 504 collects addresses for the portion of memory. Memory addresses for the identified portion(s) of memory can be gathered, e.g., by a memory controller for the memory 110.

Step 506 pauses non-capture related input/output requests to the storage. The memory imager module 120, for example, can interact with an operating system of the computing device 102 to prevent input/output requests to the data storage media 108.

Step 508 pauses non-capture related computing activity. For example, interrupts to a processor can be paused, non-capture related accesses to memory can be paused, and so forth. In at least some embodiments, additional memory addresses for the memory imaging operation can be collected after the non-capture related computing activities are paused.

Step 510 writes an image of the portion of memory to the storage. A memory controller for the memory 110, for example, can read the portion of memory using the collected memory addresses, and submit an image of the portion of memory for storage on the memory images 122, e.g., via a controller for the data storage media 108. The image of the portion of memory can be written to storage to enable persistent (e.g., non-volatile) storage of the image.

Step 512 resumes allowing non-capture related computing activity. For example, interrupts can be permitted to access an associated processor, non-capture related accesses to the memory can be permitted, and so forth.

Step 514 resumes allowing non-capture related input/output requests to the storage. The memory imager module 120, for example, can interact with an operating system of the computing device 102 to allow input/output requests from other processes to the data storage media 108.

As referenced above, the image of the portions of memory can be accessed from storage to perform various tasks.

Having discussed some example procedures, consider now a discussion of an example system and device in accordance with one or more embodiments.

Example System and Device

Figure 6:
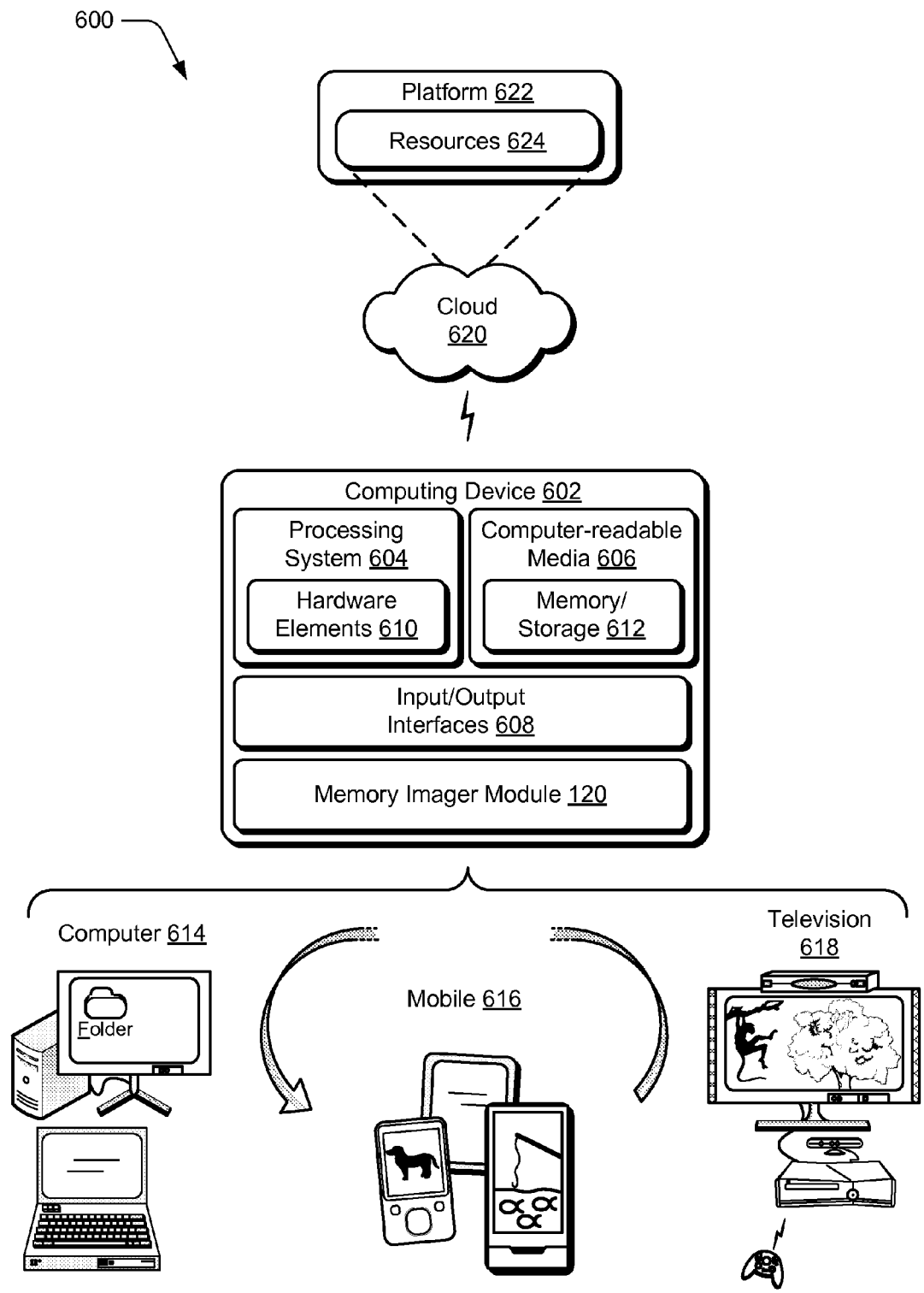
FIG. 6 illustrates an example system and computing device as described with reference to FIG. 1, which are configured to implement embodiments of techniques described herein.

FIG. 6 illustrates an example system generally at 600 that includes an example computing device 602 that is representative of one or more computing systems and/or devices that may implement various techniques described herein. For example, the computing device 102 discussed above with reference to FIG. 1 can be embodied as the computing device 602. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more Input/Output (I/O) Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 160 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules that are executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. For example, functionalities discussed with reference to the memory imager module 120 may be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for memory image capture via memory write from a running system are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage media comprising instructions stored thereon that, responsive to execution by a computing device, cause the computing device to perform operations comprising:
    receiving a request to capture an image of at least one portion of memory;
    ascertaining whether to capture the entire image of the at least one portion of memory via an intermediate write to memory, or to capture the entire image of the at least one portion of memory directly to storage without capturing any of the image via an intermediate write to memory;
    in an event that the entire image of the at least one portion of memory is to be captured via an intermediate write to memory:
        allocating a buffer region in memory in which to store the image of the at least one portion of memory;
        pausing non-capture related computing activity;
        writing an image of the at least one portion of memory to the allocated buffer region; and
        resuming allowing non-capture related computing activity prior to writing the image of the at least one portion of memory from the allocated buffer region to storage; and in an event that the entire image of the at least one portion of memory is to be captured directly to storage instead of the intermediate write to memory, writing the entire image of the at least one portion of memory to storage media of the device.

2. One or more computer-readable storage media as recited in claim 1, wherein said receiving is responsive to an error condition of a process associated with the at least one portion of memory.

3. One or more computer-readable storage media as recited in claim 1, wherein said receiving is responsive to a request to capture the entire image of the at least one portion of memory via an intermediate write to memory.

4. One or more computer-readable storage media as recited in claim 1, wherein said receiving is responsive to a user-initiated request for the image of the at least one portion of memory.

5. One or more computer-readable storage media as recited in claim 1, wherein the at least one portion of memory is identified based on the request, or is automatically selected in response to the request.

6. One or more computer-readable storage media as recited in claim 1, wherein in an event that the entire image of the at least one portion of memory is to be captured via an intermediate write to memory, the operations further comprise, prior to said writing, collecting memory addresses for the at least one portion of memory to enable the entire image of the at least one portion of memory to be read from memory and written to the allocated buffer region.

7. One or more computer-readable storage media as recited in claim 1, wherein the storage comprises data storage media separate from the memory.

8. A system comprising:
at least one processor; and
one or more computer-readable storage media including instructions stored thereon that, responsive to execution by the at least one processor, cause the system to perform operations including:
receiving a request to capture an image of at least one portion of memory;
ascertaining whether to capture the entire image of the at least one portion of memory via an intermediate write to memory, or to capture the entire image of the at least one portion of memory directly to storage without capturing any of the image via an intermediate write to memory;
in an event that the entire image of the at least one portion of memory is to be captured via an intermediate write to memory:
pausing non-capture related computing activity;
writing an image of the at least one portion of memory to an allocated buffer region of the memory; and
resuming allowing non-capture related computing activity prior to writing the image of the at least one portion of memory from the allocated buffer region to storage; and
in an event that the entire image of the at least one portion of memory is to be captured directly to storage instead of the intermediate write to memory, writing the entire image of the at least one portion of memory to storage media of the system.

9. A system as recited in claim 8, wherein said receiving is responsive to an error condition of a process associated with the at least one portion of memory.

10. A system as recited in claim 8, wherein said receiving is responsive to a user-initiated request for the image of the at least one portion of memory.

11. A system as recited in claim 8, wherein the request specifies to capture the entire image of the at least one portion of memory via the intermediate write to memory, or directly to storage.

12. A system as recited in claim 8, wherein said ascertaining comprises determining whether there is sufficient memory space to capture the entire image of the at least one portion of memory, and:
responsive to a determination that there is sufficient memory space to capture the entire image of the at least one portion of memory, capturing the entire image of the at least one portion of memory via the intermediate write to memory; or
responsive to a determination that there is not sufficient memory space to capture the entire image of the at least one portion of memory, capturing the entire image of the at least one portion of memory directly to storage without capturing any of the image via an intermediate write to memory.

13. A system as recited in claim 8, wherein the at least one portion of memory is identified based on portions of the memory accessed within a specified period of time.

14. A computer-implemented method, comprising:
receiving a request to capture an image of at least one portion of memory;
ascertaining whether to capture the entire image of the at least one portion of memory via an intermediate write to memory, or to capture the entire image of the at least one portion of memory directly to storage without capturing any of the image via an intermediate write to memory;
in an event that the entire image of the at least one portion of memory is to be captured via an intermediate write to memory, pausing non-capture related computing activity, writing the entire image of the at least one portion of memory to a buffer region of the memory, and resuming non-capture related computing activity prior to writing the entire image of the at least portion of memory to storage; and
in an event that the entire image of the at least one portion of memory is to be captured directly to storage instead of the intermediate write to memory, writing the entire image of the at least one portion of memory to storage.

15. A method as described in claim 14, wherein said receiving is responsive to an error condition of a process associated with the at least one portion of memory.

16. A method as described in claim 14, wherein the request specifies to capture the entire image of the at least one portion of memory via the intermediate write to memory, or to capture the entire image of the at least one portion of memory directly to storage without capturing any of the image via an intermediate write to memory.

17. A method as described in claim 14, wherein said receiving is responsive to a user-initiated request for the image of the at least one portion of memory.

18. A method as described in claim 14, wherein said ascertaining comprises determining whether there is sufficient memory space to capture the entire image of the at least one portion of memory, and:
responsive to a determination that there is sufficient memory space to capture the entire image of the at least one portion of memory, capturing the entire image of the at least one portion of memory via the intermediate write to memory; or
responsive to a determination that there is not sufficient memory space to capture the entire image of the at least one portion of memory, capturing the entire image of the at least one portion of memory directly to storage without capturing any of the image via an intermediate write to memory.

19. A method as described in claim 14, wherein said ascertaining comprises:
- determining that there is not sufficient memory space to capture the entire image of the at least one portion of memory;
- eliminating one or more lower priority portions of the at least one portion of memory until a size of the at least one portion of memory is such that there is sufficient memory space to capture the entire image of the at least one portion of memory; and
- capturing the entire image of the at least one portion of memory via the intermediate write to memory.

20. A method as described in claim 14, wherein the at least one portion of memory is identified based on portions of the memory accessed within a specified period of time.

* * * * *